United States Patent Office 3,332,783
Patented July 25, 1967

3,332,783
HARD CANDY FROM HIGH MALTOSE
CORN SYRUP
Robert R. Frey, Huntingdon Valley, Pa., assignor to Richardson-Merrell Inc., New York, N.Y., a corporation of Delaware
No Drawing. Filed Jan. 16, 1964, Ser. No. 338,013
7 Claims. (Cl. 99—134)

This invention relates to an improvement in the art of making hard candy and includes the new hard candy as well as the new process by which it is made.

As generally understood, hard candy is a solidified solution of amporphous saccharides which is generally clear. It is a sugar solution cooked to so high a temperature that most of the moisture is removed. The solid solution is usually modified with flavoring agents, colors, and in the case of cough drops, medicaments of various kinds.

One of the usual methods of making hard candy involves heating a solution of about 65 percent by weight (dry basis) of sucrose and 35 percent by weight (wet basis) of corn syrup and sufficient water to dissolve the materials. This solution is cooked to about 290° F. to 300° F. and then subjected to a vacuum which reduces the moisture content to less than about 3 percent by weight. The hot plastic mass is thereby cooled to about 260° F. and transferred to a mixing table where flavors, colors, and other ingredients are added to the hot candy mass by mechanically working it with suitable mixing equipment. As these flavoring agents are being worked into the candy, it cools and hardens to a point where it is a semisolid plastic of sufficient hardness to just about hold a formed shape. The semisolid plastic mass is then formed into a continuous rope and then fed into a forming machine in which small pieces are continually cut from the rope and formed into the desired shape. The formed drops are then cooled with cold dry air and the candy pieces harden to a rigid solid. If properly made, the candy is clear and shiny.

For many years the principal ingredient of hard candy has been sucrose. However, it has not been possible to make a suitable hard candy containing only sucrose because highly concentrated sucrose solutions form crystals or grains spontaneously when cooled. Sugar solutions which have been induced to dissolve more sugar as a result of heat than they are capable of holding at room temperature will always grain on cooling unless prevented by suitable means. The very act of graining is one of throwing out the excess sugar which the solution cannot contain under the prevailing temperature conditions.

Invert sugar and corn syrup are used in hard candy manufacturing processes to control the graining of sucrose. The use of corn syrup or invert syrup and mixtures of these in addition to the sucrose has made the mass production and distribution of hard candy possible. However, invert sugar, to a large extent, and corn syrup, to a slightly lesser extent, have added to the hygroscopicity of hard candy.

In effect, the need to inhibit graining of sucrose in hard candy created the problem of hygroscopicity. Where there is sufficient corn syrup and/or invert sugar present to inhibit the tendency of sucrose to grain, the candy tends to become hygroscopic. Thus in hard candy a suitable balance must be achieved between the amount of sucrose and the amount of corn syrup and/or invert syrup that is added to prevent graining. The need for this balance is repeatedly stressed in most candy text books.

Normally, hard candy is made from a mixture of 60 to 80 percent by weight of sucrose and 20 to 40 percent by weight of corn syrup (wet basis). By using special grades of low dextrose equivalent corn syrups, it is possible to cut the requirements of sucrose down to about 50 percent by weight without encountering objectionable hygroscopicity. In times of sugar shortages and high prices, many efforts were made to decrease the sucrose content of hard candy but this was done at the expense of physical stability brought about largely by increased hygroscopicity.

The pattern of higher hygroscopicity with increased corn syrup or invert sugar content has been well established and is well recognized. Control of the ratio of corn syrup to sucrose in hard candy is considered to be so important that a major control test for hard candy is the total reducing sugar contents (TRS) which in effect measures the ratio of sucrose to corn syrup and/or invert sugar in the cooked saccharide mass. To obtain the best pattern of physical stability, that is, a minimum of graining and hygroscopicity, the total reducing sugar content of hard candy should be within the range 12 percent to 20 percent.

Corn syrup has been produced for many years by the partial acid hydrolysis of corn starch. In this hydrolysis the corn starch molecules are split up in a fairly random pattern. The degree of acid hydrolysis governs the final carbohydrate breakdown. For instance, complex hydrolysis of corn starch yields nothing but dextrose. Recently it has been found that the normal carbohydrate breakdown using acid hydrolysis can be altered greatly by the use of certain enzymes which lead to the formation of a corn syrup having a relatively high maltose content. These high maltose containing syrups have been made available to the confectionery trade and are finding wide acceptance. One such high maltose corn syrup has the following physical and chemical properties:

*High maltose corn syrup*

| | |
|---|---|
| Baumé _____deg__ | 43 |
| Moisture _____percent__ | 19.7 |
| Dextrose equivalent (D.E.) _____ | 42 |
| Carbohydrate breakdown (dry basis): | |
|     Monosaccharides (dextrose) _____percent__ | 5.9 |
|     Disaccharides (maltose) _____do____ | 44.4 |
|     Trisaccharides _____do____ | 12.7 |
|     Tetrasaccharides _____do____ | 3.3 |
|     Pentasaccharides and higher _____do____ | 33.7 |
| Viscosity C.p.s. at 80° F. _____ | 56,000 |

Although it has been reported that this high maltose corn syrup can replace regular corn syrup in the manufacture of hard candy and that as much as 50 percent of the syrup (wet basis) may be used with 50 percent of sucrose, experiments have shown that the product is hygroscopic. This may be due to the fact that as the amount of high maltose corn syrup is increased and the sucrose content is decreased, the resulting solution has a higher viscosity thereby making it more difficult to raise the temperature of the solution to a point where most of the moisture is removed. The increased difficulty of cooking may increase the inversion of sucrose to invert sugar which markedly increases the hygroscopicity of the hard candy.

The present invention is based upon my surprising discovery that clear, bright, relatively non-hygroscopic hard candy of excellent physical properties can be produced without the necessity of using the expensive sucrose if all or substantially all of the sucrose is replaced with a high maltose corn syrup.

Hard candy can be made without sucrose using high maltose corn syrups in accordance with the present invention in conventional candy cooking equipment. No special equipment for cooking the candy or processing the resulting hot candy mass into its finished form is necessary. It can be produced in a continuous cooker by continually feeding the high maltose corn syrup through a steam jacketed coil which raises the temperature to about 290° F. As the hot syrup discharges from the heating coil, it is continuously drawn into a vacuum pan under about 15 inches of mercury. The hot candy mass is periodically discharged from the vacuum pan and processed in the usual manner. Under the conditions of 290° F. cooking temperature and 15 inches of vacuum, the moisture content of the final candy will be between about 1 percent to 1½ percent. The total reducing sugar content will be about 40 to 45 percent. Wider ranges of both moisture, that is 0.5 to 4 percent, and the total reducing sugar content, between about 35 to 55 percent, are possible.

Since, as noted above, hard candy of conventional manufacture has a total reducing sugar content of 12 to 20 percent, it will be seen that the new hard candy of the present invention made without sucrose and with the high maltose corn syrup as the major, if not sole, source of saccharides and having total reducing sugars of 35 percent to 55 percent is a development which changes previously recognized concepts of hard candy manufacture.

EXAMPLE

High maltose corn syrup is metered into a predissolver at a uniform rate of 1,250 pounds per hour. At the same time a solution containing 400 grams of caramel coloring, 10 grams of silicon antifoam emulsion AF, and sufficient water to make 30 gallons is metered into a predissolver at a uniform rate of ½ gallon per minute.

The predissolver is designed so that the high maltose corn syrup and the color solution are thoroughly mixed and heated to 230° F. This solution is then continuously metered into a steam jacketed coil at the rate of 1,000 pounds per hour of cooked candy. Sufficient steam pressure is used to raise the temperature of the solution to 290° F. As the hot solution discharges from the heating coil, it is continually drawn into a vacuum pan under 15 inches of vacuum. When 100 pounds of hot candy has accumulated in the vacuum pan, the vacuum is broken and the hot candy mass (at about 270° F.) is transferred to a cooled mixing table. The syrup solution remains in the steam jacketed coil for less than 30 seconds.

During the subsequent mixing and cooling, a solution containing benzyl alcohol, menthol, oil of eucalyptus, thymol, camphor, and tolu is slowly added and mixed into the 100 pounds of hot candy. When the temperature of the hot candy mass is reduced to around 230° F., it is placed in a batch former, formed into a rope by rope sizing wheels and cut and formed into the desired shape. The formed drops are then cooled.

Variations in the specifications of the high maltose syrup suitable for use in practicing the process of the present invention are possible within the following limits.

*High maltose corn syrup*

| | |
|---|---|
| Baumé _____deg__ | 41–44 |
| Moisture _____percent__ | 22.5–16 |
| Dextrose equivalent _____ | 35–55 |
| Carbohydrate breakdown (dry basis): | |
|    Monosaccharides (dextrose) ____percent__ | 0–12 |
|    Disaccharides (maltose) _____do____ | 35–55 |
|    Trisaccharides _____do____ | 10–20 |
|    Tetrasaccharides _____do____ | 2–10 |
|    Pentasaccharides and higher _____do____ | 15–50 |
| Viscosity cps. at 80° F.—35,000 at 43° Bé., 140,000 at 43° Bé. | |

During the cooking process some of the higher saccharides may be broken down so that the saccharide content of the final candy may have a slightly higher proportion of the lower saccharides. A comparison of the saccharide content of commercial hard candy in the form of cough drops with the hard candy of the present invention is as follows:

| | Sucrose/ Corn Syrup Formula 54/46 | All high Maltose Corn Syrup Formula |
|---|---|---|
| Monosaccharides (Dextrose), percent | 5.5 | 5.9 |
| Disaccharides: | | |
|   (Sucrose), percent | 59.5 | |
|   (Maltose), percent | 4.6 | 44.4 |
| Trisaccharides, percent | 4.1 | 12.7 |
| Higher saccharides, percent | 26.3 | 37 |

As will be noted, the new hard candy of the present invention made by the preferred process contains none of the disaccharide sucrose. It contains much more of the reducing saccharides. Inasmuch as maltose and dextrose are not as sweet as sucrose, it may be desirable in some types of candy to add a small percentage of sucrose or other saccharides, up to about 10 percent by weight. These amounts of sucrose do not greatly detract from the advantages of the present invention. Also the artificial sweetening agents such as saccharin at the rate of about 10 ounces per 500 pounds of candy or sodium cyclamate at the rate of about 100 ounces per 500 pounds of candy may be used to match the sweetness of conventional hard candy. It is also possible to add other saccharides such as dextrose and maltose in small amounts. Other non-toxic polyhydroxy compounds such as glycerol, sorbitol, propylene glycol, polyethylene glycol, and the like may be added up to about 5 percent by weight as plasticizers and to reduce stickiness during manufacture of the cooked candy into the finished form. Various other conventional additives such as colors, flavors, medicaments, and the like may also be added in the usual proportions.

Hard candy made with only high maltose corn syrup as a source of saccharide is completely immune from graining which is characteristic of hard candy containing sucrose. Graining which occurs with sucrose containing hard candies makes the product dull, then cloudy, and finally completely opaque with the original sparkling, clear color turned into dull, lifeless appearance on standing under conditions of high humidity for a comparatively short time.

Also surprisingly, I have found that the new hard candy of the present invention is characterized by having increased demulcent properties. This is an important advantage when the candy is used as a base for cough drops, throat lozenges, and the like as the demulcent action increases the effectiveness of these products. The increased demulcent properties are easily demonstrated by viscosity measurements of solutions of dissolved hard candy.

In a series of comparative tests, three commercially available brands of cough drops were compared with cough drops prepared with high maltose corn syrup in accordance with the present invention. The finished drops were dissolved in water at a dilution of 1 part of the hard candy with 1 part of water and the resulting viscosity in centipoises measured at 24° C. The results were as follows:

| | Cps. |
|---|---|
| Cough drop A | 23 |
| Cough drop B | 19 |
| Cough drop C | 21 |
| Cough drops of the present invention | 30 |

As will be seen, the cough drops of the present invention have a significantly higher viscosity when measured under the conditions described which reflects their improved demulcent properties. Cough drops having a viscosity within the range 25 to 35 centipoises, when a solution of 1 part by weight dissolved with 1 part of water and measured at 24° C., are a distinguishing characteristics over the prior art.

In another series of experiments several flavors of a leading brand of cough drops were compared as to physical stability with cough drops made with high maltose syrup by the process of the present invention. The coloring, flavoring, and medication were exactly the same in both kinds of cough drops. The finished cough drops were packaged in the usual way and maintained at a temperature of 90° F. and a relative humidity of 85 percent. After two days the commercial cough drops commenced to show signs of stickness whereas those of the present invention were still dry. After four days of storage, the commercial cough drops made with 60 percent sucrose and 40 percent corn syrup had become slightly dull and were slightly sticky whereas the cough drops made in accordance with the process of the present invention were shiny and dry or only very slightly sticky. After five days the commercial cough drops commenced to show signs of graining whereas the cough drops of the present invention were still very shiny. After seven days the cough drops of the present invention were still very shiny but sticky to the touch.

What is claimed is:

1. A method of preparing hard candy free from graining tendencies which comprises heating a syrup substantially free of sucrose containing on a dry basis not more than 12 percent by weight of dextrose 35 to 55 percent by weight of maltose and the remainder being higher saccharides for a period of time sufficient to reduce the moisture content to less than 4 percent by weight and allowing the cooked syrup to cool and solidify.

2. A method of preparing hard candy free from graining tendencies which remains clear on standing under normal conditions of atmospheric humidity which comprises heating a saccharide syrup substantially free of sucrose having a dextrose equivalent between 35 and 55 and having on a dry basis 0 to 12 percent by weight of dextrose, 35 to 55 percent by weight of maltose, 10 to 20 percent by weight of trisaccharides, 2 to 10 percent by weight of tetrasaccharides, and 15 to 50 percent by weight of penta- and higher saccharides for a period of time sufficient to reduce the moisture content to below 4 percent by weight and allowing the cooked syrup to cool and solidify.

3. A method of making hard candy free from a tendency to grain which comprises heating a saccharide syrup substantially free of sucrose which is characterized by the following physically and chemical properties:

*High maltose corn syrup*

| | |
|---|---|
| Baumé _____deg__ | 41–44 |
| Moisture _____percent__ | 22.5–16 |
| Dextrose equivalent _____ | 35–55 |
| Carbohydrate breakdown (dry basis, percent by weight): | |
| Monosaccharides (dextrose) ____percent__ | 0–12 |
| Disaccharides (maltose) _____do____ | 35–55 |
| Trisaccharides _____do____ | 10–20 |
| Tetrasaccharides _____percent__ | 2–10 |
| Pentasaccharides and higher _____do____ | 15–50 |

Viscosity cps. at 80° F.—35,000 at 43° Bé, 140,000 at 43° Bé. for a period of time sufficient to reduce the moisture content to less than 4 percent by weight and allowing the cooked syrup to cool and solidify.

4. A method of making hard candy in accordance with claim 3 in which sucrose is added to the syrup up to amounts not in excess of 10 percent by weight of said candy.

5. A method of making hard candy in accordance with claim 3 which includes adding to the syrup an artificial sweetening agent sufficient to achieve the desired degree sweetness.

6. Hard candy characterized by its freedom from graining tendencies and having high clarity which is maintained on standing under normal conditions of atmospheric humidity being substantially free of sucrose and containing other saccharides in the following proportions:

| | Percent |
|---|---|
| Dextrose _____ | 0 to 12 |
| Maltose _____ | 35 to 55 |
| Trisacchardies _____ | 10 to 20 |
| Tetrasaccharides _____ | 2 to 10 |
| Higher saccharides _____ | 15 to 50 | and having less than 4 percent by weight of water.

7. Hard candy cough drops characterized by high demulcent action, by freedom from graining tendencies and having high clarity which is maintained on standing under normal atmospheric humidity being substantially free of sucrose and containing other saccharides in the following proportions:

| | Percent |
|---|---|
| Dextrose _____ | 0 to 12 |
| Maltose _____ | 35 to 55 |
| Trisaccharides _____ | 10 to 20 |
| Tetrasaccharides _____ | 2 to 10 |
| Higher saccharides _____ | 15 to 50 | containing artificial sweetening agents and aromatic oils and having less than 4 percent by weight of water said candy having a viscosity when dissolved in an equal weight of water and measured at 24° F. of between 25 and 35 centipoises.

References Cited

UNITED STATES PATENTS 3,114,642   12/1963   Meisel _____ 99—134

OTHER REFERENCES

Snyder, E. C.: Manufacturing Confectioner, vol. 43, June 1963, pp. 31–33.

A. LOUIS MONACELL, *Primary Examiner.*

RAYMOND N. JONES, *Examiner.*

S. E. HEYMAN, *Assistant Examiner.*